United States Patent
Tanaka et al.

[11] Patent Number: 5,883,773
[45] Date of Patent: Mar. 16, 1999

[54] MANUAL OPERATING DEVICE FOR AUTO-REVERSE CASSETTE TAPE RECORDER

[75] Inventors: Shinsaku Tanaka, Tokyo; Toshio Yoshimura, Kawasaki, both of Japan

[73] Assignee: Tanashin Denki Co., Ltd., Tokyo, Japan

[21] Appl. No.: 889,097

[22] Filed: Jul. 7, 1997

[30] Foreign Application Priority Data

Jul. 9, 1996 [JP] Japan .................................. 8-198256
Dec. 6, 1996 [JP] Japan .................................. 8-359808

[51] Int. Cl.⁶ ................................................. G11B 5/008
[52] U.S. Cl. ............................................................ 360/137
[58] Field of Search ......................... 360/74.1, 69, 96.3, 360/96.2, 137

[56] References Cited

U.S. PATENT DOCUMENTS

| | | | |
|---|---|---|---|
| 4,802,029 | 1/1989 | Tanaka et al. | 360/74.1 |
| 4,825,322 | 4/1989 | Kunze | 360/96.3 |
| 4,843,499 | 6/1989 | Ogawa | 360/96.3 |
| 5,006,941 | 4/1991 | Otsuki | 360/96.2 |

FOREIGN PATENT DOCUMENTS

| | | |
|---|---|---|
| 7-65440 | 3/1995 | Japan . |
| 7-25870 | 6/1995 | Japan . |
| 2187029 | 12/1986 | United Kingdom . |
| 2220518 | 4/1989 | United Kingdom . |

*Primary Examiner*—William J. Klimowicz
*Attorney, Agent, or Firm*—Dickinson Wright PLLC

[57] ABSTRACT

To simplify the construction of a manual operating device for an auto-reverse cassette tape recorder, in which the feed direction of the tape is reversed by depressing an FF operating member and a REW operating member at a time. A FF/REW locking mechanism is rocked to a greater extent when a REW operating member is depressed alone than when an FF operating member is depressed alone. An auto-reverse mechanism is operated with the greater extent rocking movement of the FF/REW locking mechanism.

7 Claims, 4 Drawing Sheets

MANUAL OPERATING DEVICE FOR AUTO-REVERSE CASSETTE TAPE RECORDER

BACKGROUND OF THE INVENTION

1. Field of the Invention

This invention relates to a cassette tape recorder with an auto-reverse function and, more particularly, to a manual operating device for an auto-reverse cassette tape recorder, which permits manually reversing the tape feed direction by operating an auto-reverse mechanism with simultaneous depression of a fast forward operating member (hereinafter referred to as FF operating member) for fast feeding the tape in a tape feed direction and a rewind operating member (hereinafter referred to as REW operating member) for rewinding the tape in the opposite direction to the tape feed direction.

2. Description of the Related Art

Manual operating devices of this type are disclosed in Japanese Utility Model Publication No. 7-25870 and Japanese Patent Disclosure No. 7-65440.

Specifically, these publications disclose structures, in which the auto-reverse mechanism is operated by a fast forward/rewind (FF/REW) locking mechanism with great rocking movement thereof caused when the FF and REW operating members are operated at a time and also when the REW operating mechanism is operated alone.

In the device shown in Japanese Utility Model Publication No. 7-25870, particularly a feed direction change-over member is provided. The feed direction change-over member is pushed by both the FF and REW operating members by depressing these operating members at a time. As a result, the change-over member is moved to cause great rocking movement of the FF/REW locking mechanism, thus operating the auto-reverse mechanism.

The feed direction change-over member for manually reversing the tape feed direction, however, increases the number of parts and therefore complicates the construction.

The device shown in Japanese Patent Disclosure No. 7-65440, unlike device shown in Japanese Utility Model Publication No. 7-25870, does not use any feed direction change-over member. In this device, when the FF and REW operating members are depressed at a time and also when the REW operating member is depressed alone, the REW operating member directly pushes the FF/REW locking mechanism to cause great rocking movement of the locking mechanism, thereby operating the auto-reverse mechanism. The FF and REW operating members both have their own engaging portions to engage with the FF/REW locking mechanism, and the engaging portion of the REW operating member can cause great rocking movement of the FF/REW locking mechanism to operate the auto-reverse mechanism. In order to prevent operation of the auto-reserve mechanism when the FF/REW locking mechanism is operated by the engaging portion of the FF operating member with the depression of the FF operating member alone, the locking mechanism is made to be vertically movable as well as being rockable, while imparting the REW operating member with a function of raising the locking mechanism when it is depressed. The auto-reverse mechanism is thus operated when and only when the FF/REW locking mechanism is rocked in its upper set position.

By depressing the REW operating member the auto-reverse mechanism is operated because the locking mechanism is raised and rocked. By depressing the FF operating member alone, however, operation of the auto-reverse mechanism does not become effective because the locking mechanism is rocked in its lower set position.

In this construction, it is possible to dispense with the feed direction change-over member as shown in Japanese Utility Model Publication 7-25870. However, the construction is still complicated because the FF/REW locking mechanism should be capable of being rocked and also vertically moved.

SUMMARY OF THE INVENTION

An object of the invention is to provide a manual operating device for an auto-reverse cassette tape recorder, which is simple in construction and permits three different operations, i.e., one caused by depressing the REW operating member alone, whereby a magnetic head and a pinch roller are retreated from the tape while the auto-reverse mechanism is operated to bring about a rewind (REW) mode, one caused by depressing the FF operating member alone, whereby the magnetic head and the pinch roller are retreated from the tape to bring about a fast forward (FF) mode, and one caused by depressing the FF and REW operating members at a time, whereby the auto-reverse mechanism is operated to reverse the tape feed direction.

The above three operations are permitted without provision, unlike Utility Model Publication No. 7-25870, of any feed direction change-over member for manually changing the feed direction of the tape and making, as shown in Japanese Patent Disclosure No. 7-65440, to be only rockable and not vertically movable.

In the manual operating device of an auto-reverse cassette tape recorder according to the invention, a fast forward/rewind (FF/REW) locking mechanism is operated to a greater extent when the REW operating member is depressed alone than when the FF operating member is depressed alone, thus operating the auto-reverse mechanism.

With this construction, the above three operations are obtainable without any feed direction change-over member for manually reversing the feed direction of the tape but by merely making the FF/REW locking mechanism only rockable.

In the above construction, the FF/REW locking mechanism has a projection and an engaging recess. The REW operating member has a pushing portion for pushing the projection and a REW engaging recess for engagement with the engaging piece. The FF operating member has an FF engaging recess of the same shape as the REW engaging recess for engaging with the engaging piece. The operating stroke of the FF/REW locking mechanism when the projection thereof is pushed by the pushing portion of the REW operating member, is set to be greater than the operating stroke of the FF/REW locking mechanism when the REW or FF engaging recess is engaged with the engaging piece.

With this arrangement of the FF/REW locking mechanism, the REW and FF operating members which have the same shape can be locked in their depressed position under the same condition. Besides, it is possible to freely set the extent of rocking movement of the FF/REW locking mechanism as defined by the contact between the pushing portion and the projection.

With the FF and REW operating members supported on a support member such that the support member is moved in the same direction as these members when an eject operating member is depressed, the eject operating member and FF and REW operating members may be held retreated in their restored positions when no cassette is loaded. Thus, when the invention is applied to a vehicle-mounted tape recorder, none of push buttons of the eject, FF and REW operating members substantially projects from the dashboard of the vehicle in the absence of any loaded cassette, and it is possible to improve the operating environment.

In this case, an arrangement in that FF and REW return springs are provided between the support member and the respective FF and REW operating members, can avoid heavier operation of the eject operating member which would otherwise be the case due to the return springs.

With the support member and the eject operating member interlocked to each other via a coupling member and for adjusting the difference between the moving strokes of the support member and the eject operating member with the coupling member, it is possible to permit the moving stroke of the support member to be set freely and independently of the moving stroke of the eject operating member.

In order to prevent erroneous operation of the auto-reverse mechanism due to pushing of the projection of the FF/REW locking mechanism by the pushing portion of the REW operating member when the support member is moved with the FF and REW operating members in the depressing direction with an operation of depressing the eject operating member, the FF/REW locking mechanism is arranged to be rockable and vertically movable, and the support member is arranged such that when it is moved, its portion causes a change in the height level of the FF/REW locking mechanism to block an interlocking route, which is led from the REW operating mechanism through the FF/REW locking mechanism to the auto-reverse mechanism. Making the FF/REW locking mechanism to be rockable and vertically movable, makes it possible to add entirely different functions.

BRIEF DESCRIPTION OF THE DRAWINGS

These and other objects, features and advantages of the invention will become more apparent upon a reading of the following detailed specification and drawings, in which.

DESCRIPTION OF THE PREFERRED EMBODIMENTS

An embodiment of the invention will now be described.

Figure 1:
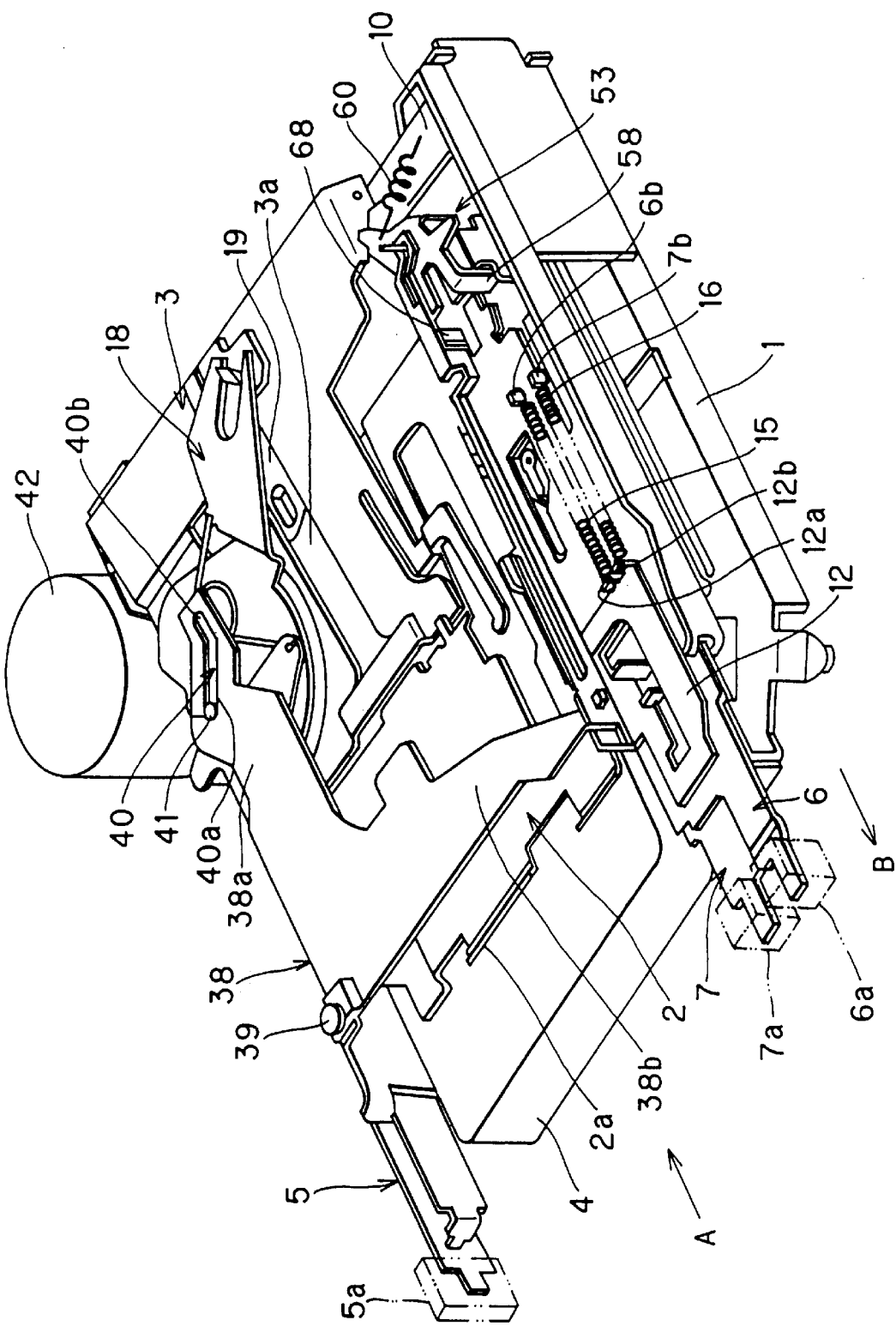
FIG. 1 is a perspective view showing the mechanism part of a cassette tape recorder incorporating an embodiment the manual operating device according to the invention.

FIG. 1 is a perspective view showing the mechanical part of a vehicle-mounted auto-reverse cassette tape recorder incorporating a manual operating device according to the invention. On a tape recorder chassis 1, a cassette holder 2 is mounted via a rocking plate 3. The rocking plate 3 is mounted for vertical rocking movement on the upper end of the rear most portion (right end in the figure) of the chassis 1. The cassette holder 2 is pivoted to the rocking end of the rocking plate 3. The cassette 4 has a well-known structure with a tape (not shown) accommodated therein, and it is inserted into the cassette holder 2 from a cassette insertion slot 2a thereof provided at the front end (i.e., left end in the figure) in the direction of arrow A. FIG. 1 shows the tape recorder in playback mode with the cassette 4 loaded.

Figure 4:
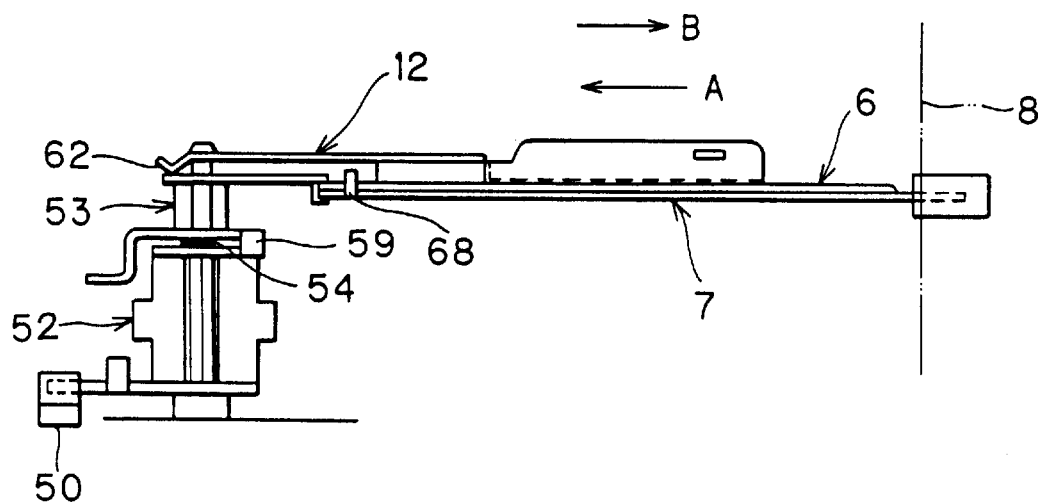
FIG. 4 is a view for describing the operation of the part shown in FIG. 3.

The tape recorder is mounted in the dashboard of a vehicle with the cassette insertion slot 2a directed toward the front. An eject operating member 5 is provided on the left side of the chassis 1. On the right side of the chassis 1, a fast forward operating member(i.e., FF operating member) 6 for fast feeding the tape in the cassette in the tape feed direction, and a rewind operating member(i.e., REW operating member) 7 for rewinding the tape in the opposite direction to the tape feed direction are provided. The operating members 5, 6 and 7 are capable of being advanced and retreated in the directions of arrows A and B. These operating members 5, 6 and 7 have push buttons 5a, 6a and 7a respectively which are mounted on their front end. When the cassette 4 is loaded, the push buttons 5a, 6a and 7a project from the outer surface of the dashboard (FIG. 4).

Figure 2:
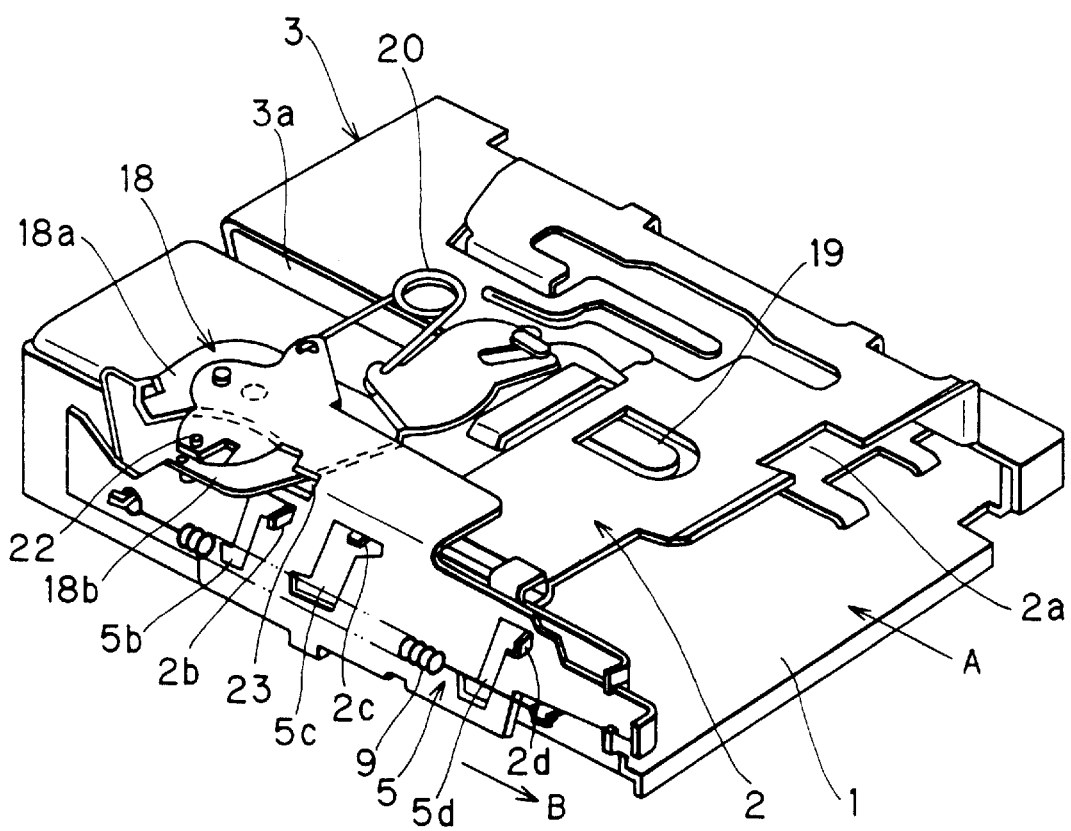
FIG. 2 is a perspective view showing a cassette loading part of the cassette tape recorder shown in FIG. 1.

As shown in FIG. 2, which shows the relation between the eject operating member 5 and the cassette holder 2, an eject return spring 9 is provided between the eject operating member 5 and the chassis 1.

As shown in FIG. 1, a plate-like bracket 10 is secured to the right side portion of the chassis 1. The FF and REW operating members 6 and 7 noted above are mounted on the bracket 10 for advancement and retreat in the directions of arrows A and B. A plate-like support member 12 is disposed above the operating member 6. The operating members 6 and 7 are supported on the support member 12 for independent movement to constant stroke in the directions of arrows A and B.

A FF return spring 15 for returning the FF operating member in the direction (arrow B) opposite to the direction (arrow A) of its depression, is provided between a spring hook 6b of the FF operating member 6 and a spring hook 12a of the support member 12. A REW return spring for returning the REW operating member 7 in the direction (arrow B) opposite to the direction (arrow A) of its depression, is provided between a spring hook 7b of the REW operating member 7 and the spring hook 12b of the support member 12. The two operating members 6 and 7 and the support member 12 are thus elastically coupled together.

As shown in FIGS. 1 and 2, a engaging plate 18 is rockably mounted on the rocking plate 3. The rocking plate 3 has a guide groove 3a which is elongate in the directions of arrows A and B. A slider 19 is mounted for advancement and retreat in the guide groove 3a, and coupled to the engaging plate 18. As shown in FIG. 2, the engaging plate 18 has a pair of arcuate arms 18a and 18b, and a toggle spring 20 is provided between the engaging plate 18 and the eject operating member 5. The eject operating member 5 has a downwardly projecting push pin 22, which is located between the pair arms 18a and 18b. The arm 18b extends through an opening 23 of the eject operating member 5. The push pin 22 and the arm 18b constitute an eject locking mechanism for locking the eject operating member 5 at a depressed position thereof.

With the insertion of the cassette 4 into the cassette holder 2, the slider 19 is engaged in an axial hole of the cassette 4, and it is moved in the direction of arrow A by the force, with which to push the cassette 4. When the toggle spring 20 is inverted beyond its dead point, the slider 19 is pulled by the spring 20 into the cassette holder 2. At the same time, the engaging plate 18 is rocked in the counterclockwise direction to disengage the push pin 22 and the arm 18b form each other, thus causing the eject operating member 5 to be returned in the direction of arrow B.

To take out the cassette, the eject operating member 5 is pushed. As a result, the push pin 22 pushes the arm 18a to cause clockwise rocking movement of the engaging plate 18, thus pushing back the slider 19 in the direction of arrow B. With the inversion of the toggle spring 20 after passing the dead point, the engaging plate 18 is rocked in the clockwise direction by the spring 20, thus pushing back the slider 19 together with the cassette 4 in the direction of arrow B.

As shown in FIG. 2, the eject operating member 5 has inclined grooves 5b to 5d, and the cassette holder 2 has projections 2b to 2d formed on its left side for engagement in the inclined grooves 5b to 5d. This engagement is for causing vertical movement of the cassette holder 2 in an interlocked relation to the movement of the eject operating member 5. Specifically, when the eject operating member 5 is in its restored position, the cassette holder 2 is in its lower set position, in which playback, FF and REW modes can be caused. When the eject operating member 5 is locked in its depressed position by the engagement between the push pin 22 and the arm 18b, the cassette holder 2 is in its upper set position, in which the cassette 4 is possible to be inserted into the holder 2 and taken out therefrom.

As shown in FIG. 1, above the cassette holder 2 a substantially L-shaped coupling member 38 is disposed for rocking movement about a pin 39 on the chassis 1. The first arm 38a of the coupling member 38 has a cam groove 40, in which a cam pin 41 secured to the eject operating member 5 is engaged. The cam groove 40 has an inclined cam groove 40a inclined with respect to the direction of arrow A and a hold cam groove 40b extending from the front end of the inclined cam groove 40a in the direction of arrow A. When the eject operating member 5 is in its restored position, the cam pin 41 is located near the rear end of the inclined cam groove 40a. When the eject operating member 5 is in its depressed position, the cam pin 41 is located in the hold cam groove 40b.

The second arm 38b of the coupling member 38 extends substantially at right angles to the direction A of insertion of the cassette 4, and has a free end fitted slightly loosely in the coupling hole of the support member 12. Counterclockwise rocking movement of the coupling member 38 thus causes movement of the support member 12 together with the FF and REW operating members 6 and 7 in the direction of arrow A. Reference numeral 42 designates a tape drive motor.

Figure 3:
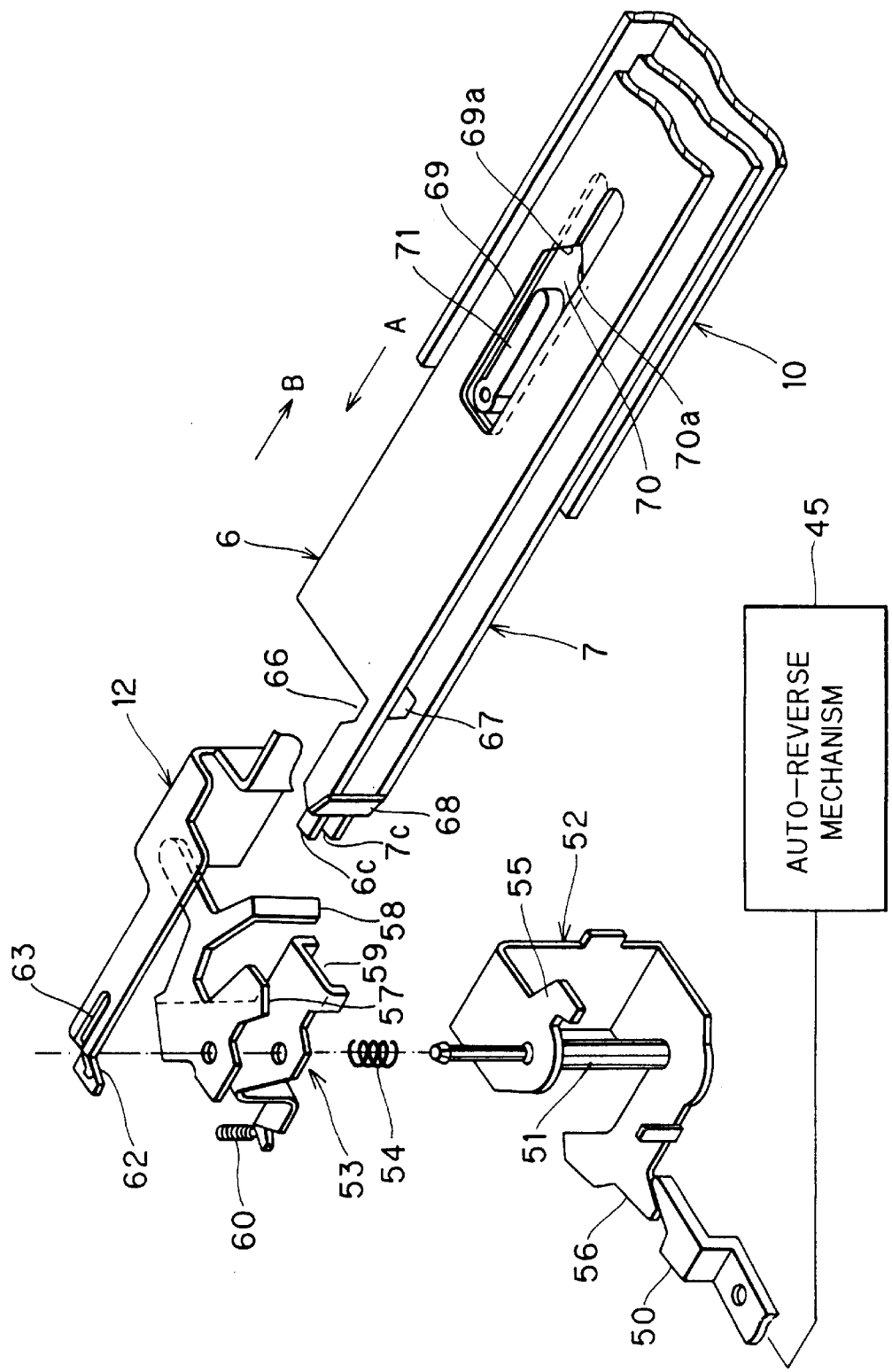
FIG. 3 is an exploded perspective view showing an essential part of the manual operating device for the cassette tape recorder shown in FIG. 1.

Referring to FIG. 3, reference numeral 50 designates a control member. The control member 50 is operatively coupled to an auto-reverse mechanism 45 which is shown by a block diagram. The operation of the mechanism 45 is normally prohibited. When the tape in the cassette 4 loaded in the tape recorder is taken up to the end, this is detected, whereupon the auto-reverse mechanism 45 is released from the prohibited state and operated. The operational relation between the control member 50 and the auto-reverse mechanism, and the specific construction of the auto-reverse mechanism are well known, for instance they are disclosed in Japanese Utility Model Publication No. 7-25870, and are not described in detail.

A trigger member 52 and an intermediate member 53 are mounted for rocking movement on a fixed shaft 51 near the control member 50, and they constitute a fast forward/rewind (FF/REW) locking mechanism. A compression coil spring 54 is provided between the trigger member 52 and the intermediate member 53. The trigger member 52 and the intermediate member 53 are each U-shaped. The trigger member 52 is disposed below the intermediate member 53, and has an engaging portion 55 formed on one side of its upper portion and a pushing portion 56 formed on the other side of its lower portion. The intermediate member 53 which is disposed above the trigger member 52, has a mountain-shaped projection 57 and a depending engaging piece 58 on its upper side, and has an inverted U-shaped engaging portion 59 formed on its lower side. The intermediate member 53 is biased clockwise around the fixed shaft 51 by a tension spring 60.

Above the intermediate portion 53 an end portion of the support member 12 extends. The end portion has a downwardly inclined retaining portion 62 and also has a slit 63 for its ready flexing.

As shown in FIG. 3, the FF and REW operating members 6 and 7 have end projections 6c and 7c with fast forward and rewind engaging recesses 66 and 67 (hereinafter referred to as FF and REW engaging recesses, respectively) formed in the right side edge. The end projection 6c of the REW operating member 7 has an upwardly bent pushing portion 68.

The FF and REW operating members 6 and 7 have openings 69 and 70 elongate in the directions of arrows A and B. A stopper 71 is rockably mounted on the bracket 10 such that it is located in the openings 69 and 70. The stopper 71 limits the movement of the FF and REW operating members 6 and 7 in the direction of arrow A to a predetermined extent. The right side edge of the opening 69 of the FF operating member 6 has an inclined pushing surface 69a, and the left side edge of the opening 70 of the REW operating member 7 has an inclined pushing surface 70a.

As shown in FIG. 4, when the support member 12 has been restored together with the eject operating member 5 in the direction of arrow B, i.e., in the presence of the cassette 4 loaded, the retaining member 62 of the support member 12 is keeping the intermediate member 53 pressed down. Thus, the intermediate member 53 is in its lowered position, and the U-shaped engaging portion 59 is engaged with the engaging portion 55.

When the FF operating member 6 is depressed alone during playback mode with the cassette loaded as above, it is moved while rocking the stopper 71 to the left with its inclined pushing surface 69a. The FF operating member 6 is thus moved beyond the predetermined extent. With this movement of the FF operating member 6 the magnetic head and pinch roller are retreated with respect to the tape in the cassette, thus bringing about an FF operation mode. The engaging piece 58 is engaged in the engaging recess 66, and the FF operating member 6 is locked in the depressed position. In this operation, the intermediate member 53 is rocked slightly, i.e., to an extent insufficient for the auto-reverse mechanism 45 to be operated with the rocking movement of both the trigger member 52 and the control member 50.

When the REW operating member 7 is depressed alone during the playback mode, it is moved while rocking the stopper 71 to the right with its inclined surface 70a. The REW operating member 7 thus can be moved beyond the predetermined extent, and with the movement of the REW operating member 7 the magnetic head and pinch roller are retreated with respect to the tape in the cassette. During the movement of the REW operating member 7 the pushing portion 68 pushes the mountain-shaped projection 57 and greatly rocks the intermediate member 53 in the counterclockwise direction so that the pushing portion 68 is allowed to pass through the projection 57. When the pushing portion 68 passes through the mountain-shaped projection 57, the intermediate member 53 is restored in the clockwise direction by the spring 60. Together with the intermediate member 53 the trigger member 52 is rocked in the counterclockwise direction to rock the control member 50 with the pushing portion 56. As a result, the control member 50 releases the prohibited state of the auto-reverse mechanism 45. The auto-reverse mechanism 45 is thus operated to reverse the feed direction of the tape and bring about a REW mode. The engaging piece 58 is engaged in the REW engaging recess 67, and the REW operating member 7 is locked in the depressed position.

During the REW mode, by slightly depressing the FF operating member 6 to such an extent that the FF engaging recess 66 is not engaged with the engaging piece 58, the intermediate member 53 is slightly rocked counterclockwise to release and return the REW operating member 7. Again in this operation, the pushing portion 68 pushes the mountain-shaped projection 57 and rocks the intermediate member 53 again in the counterclockwise direction. The auto-reverse mechanism 45 is thus operated again to reverse the feed direction of the tape to the initial tape feed direction and restore the playback mode.

When the FF and REW operating members 6 and 7 are depressed at a time during playback mode, their inclined surfaces 69a and 70a push the stopper 71 from the left and right at a time. The stopper 71 thus cannot be rocked, and the depression of the two operating members 6 and 7 are restricted to the predetermined extent noted above. This extent of depression of the operating members 6 and 7 is insufficient to cause retreat of the magnetic head and pinch roller with respect to the tape. It is also insufficient to cause engagement of the RR and REW engaging recesses 66 and 67 with the engaging piece 58. The pushing portion 68 pushes the mountain-shaped projection 57 to greatly rock the intermediate member 53 in the counterclockwise direction. However, since the pushing portion 68 pushes the mountain-shaped projection 57 and greatly rocks the intermediate member 53 in the counterclockwise direction, the trigger member 52 is rocked together with the intermediate member 53 to rock the control member 50 with its pushing portion 56. As a result, the control member 50 releases the auto-reverse mechanism 45 from the prohibited state. Thus, the auto-reverse mechanism 45 is operated to reverse the feed direction of the tape.

When the two operating members 6 and 7 are restored from the respective depressed states, the feed direction of the tape is reversed in the playback mode.

Figure 5:
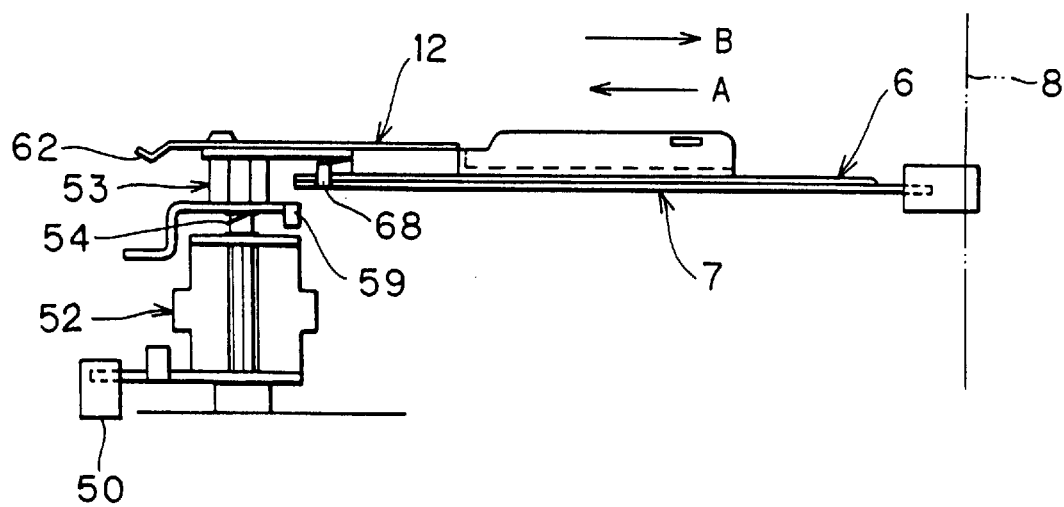
FIG. 5 is a view for describing a different operation from FIG. 4.

When the cassette 4 is subsequently taken out by depressing the eject operating member 5, the movement thereof in the direction of arrow A causes movement of the support member 12 in the same direction. At this time, the retaining portion 62 is detached from the top of the intermediate member 53, as shown in FIG. 5, causing the trigger member 53 to be restored upward by the compression coil spring 54. As a result, the U-shaped engaging portion 59 is detached from the engaging portion 55. Thus, rocking of the intermediate member 53 caused with the pushing of the mountain-shaped projection 57 by the pushing portion 68, has no bearing on the trigger member 52 and the auto-reverse mechanism 45.

With the movement of the support member 12 together with the eject operating member 5, the extent of projection of the push buttons 5a to 7a from the outer surface 8 of the dashboard is reduced, as shown in FIG. 5.

As has been described in the foregoing, in the manual operating device for an auto-reverse cassette tape recorder according to the invention, the FF/REW locking mechanism is rocked to a greater extent when the REW operating member is depressed alone than when the FF operating member is depressed alone, and the auto-reverse mechanism 45 is operated with the greater rocking of the FF/REW locking mechanism.

The device permits, with a simple construction not using any feed direction change-over member for manually reversing the feed direction of the tape and that the FF/REW locking mechanism 52, 53 is rockable only, the three different operations, i.e., one caused by depressing the REW operating member 7 for operating the auto-reverse mechanism 45 to bring about the REW mode, one caused by depressing the FF operating member 6 to bring about the FF mode, and one caused by depressing the FF and REW operating members at a time to reverse the feed direction of the tape.

The FF/REW locking mechanism 52, 53 has the projection 57 and the engaging piece 58, the REW operating member 7 has the pushing portion 68 for pushing the projection and the REW engaging recess 67 for engaging with the engaging piece, and the FF operating member 6 has the FF engaging recess 66 of the same shape as the REW engaging recess for engaging with the engaging piece. The FF/REW locking mechanism is rocked to a greater extent when the projection is pushed by the pushing portion of the REW operating member, while it is rocked to a less extent when the REW or FF engaging recess is engaged with the engaging piece. The FF/REW locking mechanism thus can lock the REW and FF operating members in their depressed positions under the same condition, and the extent of rocking of the FF/REW locking mechanism based on the contact between the pushing portion and the projection can be freely set.

The FF and REW operating members are supported by the support member 12, which is moved in the same direction as the eject operating member when the eject operating member is depressed. Thus, FF and REW operating members as well as the eject operating member can be held in their restored positions in the absence of any loaded cassette. In the absence of any loaded cassette, the push buttons are thus not projected, so that the device can improve the operational environment when it is applied to a vehicle-mounted tape recorder.

With the FF and REW return springs provided respectively between the respective FF and REW operating members on one hand and the support member on the other hand, these springs do not make the operation of the eject operating member heavier.

With the support member and the eject operating member coupled to each other via the coupling member 38, which permits adjustment of the difference between the moving strokes of the support member and the eject operating member, it is possible to set the extent of movement of the support member independently of the extent of movement of the eject operating member, and it is possible to increase the degree of freedom of design.

Moreover, with the FF/REW locking mechanism made to be rockable and also vertically movable for blocking the interlock route between the REW operating member and the auto-reverse mechanism according to the height of the FF/REW locking mechanism, it is possible to prevent erroneous operation of the auto-reverse mechanism even when the FF and REW operating members are moved in the depressing direction with the depression of the eject operating member.

What is claimed is:

1. A manual operating device for an auto-reverse cassette tape recorder having a cassette insertion slot through which a cassette accommodating a tape therein is loaded into and unloaded from said cassette tape recorder, said auto-reverse cassette tape recorder including a magnetic head and a pinch roller for being brought into contact with and separated from the tape in the loaded cassette, and an auto-reverse mechanism for automatically reversing the feed direction of said tape upon detection of the take-up of said tape to the end thereof, said manual operating device comprising:

a fast forward operating member and a rewind operating member capable of being advanced and retreated in directions parallel to each other, for causing retreat of said magnetic head and said pinch roller from a position thereof in the close proximity of said tape when depressed beyond a predetermined extent;

a fast forward return spring and a rewind return spring for returning said fast forward operating member and said rewind operating member, respectively;

a FF/REW locking mechanism for locking one of said fast forward and rewind operating member in a depressed position when said operating member is depressed alone beyond a predetermined extent; and a stopper for restricting the depression of said two operating members to said predetermined extent when said two operating members are depressed at the same time;

said auto-reverse mechanism being operated to reverse the feed direction of said tape when said rewind operating member is depressed alone and also when said fast forward and rewind operating members are depressed at the same time;

said rewind operating member, when depressed alone and also when depressed together with said fast forward operating member, directly pushing said FF/REW locking mechanism for operating said locking mechanism to a greater extent than when locking said fast forward operating member in the depressed position thereof, said auto-reverse mechanism being operated with said greater extent operation of said locking mechanism and wherein said FF/REW locking mechanism has a projection and a engaging piece, said rewind operating member has a pushing portion for pushing said projection and a rewind engaging recess for engaging with said engaging piece, said fast forward operating member having a fast forward engaging recess of the same shape as said rewind engaging recess for engaging with said engaging piece, said rewind operating member serves to push said projection with said pushing portion to cause great operation of said FF/REW locking mechanism, and either one of said two operating members is locked in the depressed position by the engagement between said engaging recess and said engaging piece when said operating member is depressed alone.

2. A manual operating device for an auto-reverse cassette tape recorder having a cassette insertion slot through which a cassette accommodating a tape therein is loaded in and unloaded from said cassette tape recorder, said auto-reverse cassette tape recorder including a magnetic head and a pinch roller for being brought into contact with and separated from the tape in the loaded cassette, and an auto-reverse mechanism for automatically reversing the feed direction of said tape upon detection of the take-up of said tape to the end thereof, said manual operating device comprising:

a fast forward operating member and a rewind operating member capable of being advanced and retreated in directions parallel to each other, for causing retreat of said magnetic head and said pinch roller from a position thereof in the close proximity of said tape when depressed beyond a predetermined extent;

a fast forward return spring and a rewind return spring for returning said fast forward operating member and said rewind operating member, respectively;

a FF/REW locking mechanism for locking one of said fast forward and rewind operating member in a depressed position when said operating member is depressed alone beyond a predetermined extent; and the same stopper for restricting the depression of said two operating members to said predetermined extent when said two operating members are depressed at a time;

said auto-reverse mechanism being operated to reverse the feed direction of said tape when said rewind operating member is depressed alone and also when said fast forward and rewind operating members are depressed at the same time;

said rewind operating member, when depressed alone and also when depressed together with said fast forward operating member, directly pushing said FF/REW locking mechanism for operating said locking mechanism to a greater extent than when locking said fast forward operating member in the depressed position thereof, said auto-reverse mechanism being operated with said greater extent operation of said locking mechanism and further comprising an eject operating member capable of being advanced and retreated in a direction parallel to said fast forward and rewind operating members, and eject return spring for returning said eject operating member, an eject locking mechanism for locking said eject operating member in a depressed position and releasing said eject operating member from the locked state in response to the loading of the cassette, and a support member for supporting said fast forward and rewind operating members and capable of being moved in the same direction as said eject operating member in an interlocked relation to the depression of said eject operating member.

3. The manual operating device for an auto-reverse cassette tape recorder according to claim 2, in which said fast forward return spring and said rewind return spring are provided respectively between said respective fast forward and rewind operating members on one hand and said support member on the other hand.

4. The manual operating device for an auto-reverse cassette tape recorder according to claim 2, in which said eject operating member and said support member are coupled to each other by a coupling member for adjusting the difference between the moving strokes of said eject operating member and said support member.

5. The manual operating device for an auto-reverse cassette tape recorder according to claim 2, in which said support member has a portion for blocking an interlocking route from said rewind operating member through said FF/REW locking mechanism to said auto-reverse mechanism when said support member is moved with the depression of said eject operating member.

6. A manual operating device for an auto-reverse cassette tape recorder having a cassette insertion slot through which a cassette accommodating a tape therein is loaded into and unloaded from said cassette tape recorder, said auto-reverse cassette tape recorder including a magnetic head and a pinch roller for being brought into contact with and separated from the tape in the loaded cassette, and an auto-reverse mechanism operable for automatically reversing the feed direction of said tape upon detection of the take-up of said tape to the end thereof, said manual operating device comprising:

- a fast forward operating member and a rewind operating member capable of being advanced and retreated in directions parallel to each other, for causing retreat of said magnetic head and said pinch roller from a position thereof in the close proximity of said tape when depressed beyond a predetermined extent, each of said operating member having an engaging recess, respectively;
- a fast forward return spring and a rewind return spring for returning said fast forward operating member and said rewind operating member, respectively;
- a locking member rockable around an axis and having an engaging piece so as to associate with said engaging recess of an operating member when said an operating member is depressed alone beyond the predetermined extent thereby to lock said operating member in a depressed position; and
- a stopper for restricting the depression of said two operating members to said predetermined extent when said two operating members are depressed at the same time;
- said rewind operating member being provided with a pushing portion which directly pushes said locking member upon depression of the rewind operating member to rock said locking member to a greater extent than when said fast forward operating member is depressed in the depressed position, whereby said auto-reverse mechanism is operated with said greater extent rocking movement of said locking member.

7. A manual operating device for an auto-reverse cassette tape recorder having a cassette insertion slot, through which a cassette accommodating a tape therein is loaded in and unloaded from said cassette tape recorder, said auto-reverse cassette tape recorder including a magnetic head and a pinch roller for being brought into contact with and separated from the tape in the loaded cassette, and an auto-reverse mechanism operable for automatically reversing the feed direction of said tape upon detection of the take-up of said tape to the end thereof, said manual operating device comprising:

- a fast forward operating member and a rewind operating member capable of being advanced and retreated in directions parallel to each other, for causing retreat of said magnetic head and said pinch roller from a position thereof in the close proximity of said tape when depressed beyond a predetermined extent;
- a fast forward return spring and a rewind return spring for returning said fast forward operating member and said rewind operating member, respectively;
- a fast forward/rewind locking mechanism rockable to a first rocking position in response to the depression of said fast forward operating member beyond the predetermined extent thereby to lock the fast forward operating member to the same depressed position;
- a stopper for restricting the depression of said two operating members to said predetermined extent when said two operating members are depressed at a time;
- pushing means provided on said rewind operating member for pushing said fast forward/rewind locking mechanism upon depression of rewind operating member to further rock said fast forward/rewind locking mechanism to a second rocking position, thereby to cause said auto-reverse mechanism to be operated.

* * * * *